United States Patent [19]

Clark et al.

[11] Patent Number: 5,163,096

[45] Date of Patent: Nov. 10, 1992

[54] STORAGE PROTECTION UTILIZING PUBLIC STORAGE KEY CONTROL

[75] Inventors: Carl E. Clark, Poughkeepsie; Michael G. Mall, Lagrangeville; Casper A. Scalzi, Poughkeepsie; Bhaskar Sinha, Wappinger Falls, all of N.Y.

[73] Assignee: International Business Machines Corporation, Armonk, N.Y.

[21] Appl. No.: 710,875

[22] Filed: Jun. 6, 1991

[51] Int. Cl.⁵ .................. H04K 1/00; G06F 12/14
[52] U.S. Cl. ........................... 380/4; 380/30; 395/425
[58] Field of Search ............. 380/4, 30; 395/425

[56] References Cited

U.S. PATENT DOCUMENTS

| | | | |
|---|---|---|---|
| 3,576,544 | 4/1971 | Cordero, Jr. et al. | 395/425 |
| 3,761,883 | 9/1973 | Alvarez et al. | 395/425 |
| 3,825,903 | 7/1974 | Brown | 395/425 |
| 4,366,537 | 12/1982 | Heller et al. | 364/200 |
| 4,405,829 | 9/1983 | Rivest et al. | 380/30 |
| 4,424,414 | 1/1984 | Hellman et al. | 380/30 |
| 4,471,163 | 9/1984 | Donald et al. | 380/30 |
| 4,472,790 | 9/1984 | Burk et al. | 364/900 |
| 4,589,064 | 5/1986 | Chiba et al. | 364/200 |
| 4,668,318 | 8/1990 | Mineo | 364/200 |
| 4,954,982 | 9/1990 | Tateishi et al. | 364/900 |

Primary Examiner—Salvatore Cangialosi
Attorney, Agent, or Firm—Bernard M. Goldman

[57] ABSTRACT

Provides three access levels of storage key protection, comprising a supervisory level (key 0), an intermediate level of non-public and non-supervisory keys (keys 1-8, 10-15), and an unique public level (key 9). The program routines operating with a supervisory-level access key can access both the public level and the intermediate level of storage blocks. Although a program routine operating with an access key in the intermediary access level cannot access any supervisory level storage block, it can access any block assigned a public level storage key, as well as any storage block assigned the respective intermediate level key. One or more third-level public storage keys (PSKs) may be provided. A program access key using one of the PSK values can only access blocks having the same PSK value, and it cannot access blocks having any other key value.

17 Claims, 4 Drawing Sheets

STORAGE PROTECTION UTILIZING PUBLIC STORAGE KEY CONTROL

INTRODUCTION

This invention enhances the use of storage protect keys for protecting programs and data in different parts of a computer memory by requiring each program to use a protection key assigned to a block of memory storage which must be accessed by the program. Such access protection protects code and data in one storage block against wild stores resulting from executing code in another area of storage, even when these different storage blocks are in the same virtual address space.

BACKGROUND

Storage protection keys for memory storage blocks have been disclosed in U.S. Pat. No. 3,576,544 entitled "Storage Protection System". by H. Cordero et al, U.S. Pat. No. 4,093,987 entitled "Hardware Control Storage Area Protection Method and Means" by C. H. Gaudette et al and U.S. Pat. No. 4,472,790 entitled "Storage Fetch Protect Override Controls" by J. L. Burk et al, all assigned to the same assignee as the present application. Storage protection keys have been used in commercial IBM S/360, S/370 and S/390 systems, and in their compatible systems.

The current IBM S/390 architecture supports storage keys 0-15 and access keys 0-15, as described in the Enterprise System Architecture S/390 Principles of Operation (form number SA22-7201-00) published by the IBM Corporation. In current IBM systems, keys 0-15 provide two levels of protection, one for a supervisory class of key (implemented with key 0) and a user class of keys (implemented with keys 1-15). The supervisory key 0 can access data in any storage block in the memory (regardless of the storage key assigned to the block). But a non-supervisory access key (of keys 1-15) is allowed store access only if equality existed between an access key (used by the accessing program) and the storage key assigned to the block in which access is being attempted.

A storage key is provided with the main storage hardware for each 4KB block (page) in the main storage of a S/360, S/370 and S/390 system. Each access to the system main storage does a protect key check of an access key provided for each accessing program. The access key is generally provided from an access key field in the program status word (PSW) of the program. The access key is matched against the storage protect key of the page being addressed in the storage system hardware, using a rather complex set of hardware-enforced rules to determine if a key match exists or not.

The matching rules include use of a fetch protect bit (FP) in each storage key. (Store accesses are not affected by the FP bit setting, and equality between the access key and storage key is needed before any store access is allowed for any non-supervisory access key 1-15.) For a fetch request, the FP bit controls whether or not equality is needed to allow access for any non-supervisory access key 1-15. If the FP bit is zero, equality is not needed to allow a fetch access which is allowed regardless of the access key value or of the storage key value. But if the FP bit is one, equality is needed to allow a fetch access for any non-supervisory key 1-15.

The supervisory access key 0 is allowed access whether it is equal or not to any of storage keys 1-15.

The storage key protection method presently found in systems using the IBM S/390 architecture is a two level protection structure, comprised of a supervisory level (key 0) and a non-supervisory level (keys 1-15). Supervisory programs can access non-supervisory assigned storage blocks, but the non-supervisory programs cannot access the supervisory assigned storage blocks.

The key protection method is provided in the critical path of each storage access in a system, since it is done for every storage access. Accordingly, the key control hardware in an S/390 system (and in its prior S/360 and S/370 systems) have been operated in a parallel manner overlapping other control operations in each access so as to not increase the access time of each storage access.

Non-IBM types of computer architectures are not known to use hardware-implemented storage protect keys in their storage protection schemes. For example, the prior Multics system used a rings of protection scheme which did not use storage protect keys. Multics is not known to assign storage keys to blocks in storage. It assigned a ring number to each process, which was enforced by program call/return instructions using segmented virtual addressing. Any process could access the virtual storage assigned to any other process assigned a lower numbered ring in a ring number hierarchy. Protect rings are not needed with this invention.

Protection keys protect accesses to the real storage in a system, and provide addressing protection in addition to other protection methods provided in S/390 systems, such as virtual addressing and virtual address spaces which provide access protection beyond that provided by storage keys. The virtual addressing of any programmed address maps it to any page location in real main storage, which makes the actual location variable and unknown to the user of the address from one instant to the next in the use of a system. If a program running in one address space is not allowed to access another address space, then the data and programs in the second address space are protected from the program. Storage keys are used to provide protection within an address space from programs that have addressing capability to the space but do not have authority to some of the data within the space.

There are other protection methods disclosed in the prior art which have little or nothing to do with the above-described key protection method, such as using a compare with upper and lower boundary addresses, which may be real or absolute addresses.

However, the different types of protection methods available in a system are not equal trade-offs with each other, since system performance is not equally impacted.

Key protection requires the initialization of the access and storage keys involved. A program's access key is specified by a field in the PSW (program status word) under which the program is executed. A storage key is associated with each block of real storage. Key protection can permit multiple levels of access authority to be used within a single program. The program may be given the capability to access more than one key. This capability is provided by a control register field called the PKM (program key mask), initialized by an operating system for the task to be executed. However in general, only one access key value may be in force at any time. (A small set of instructions exist in the S/390 architecture for moving data from one location in storage to another which allow a separate protection key for each operand. One key is the PSW key; the other key must be authorized by the PKM if the PSW is not in supervisory state (bit 15 of the PSW is zero—see FIG. 3.)) A program which is authorized to use more than one key must manage the PSW access key value by use of an instruction in S/390 called Set PSW Key From Address (SPKA), as required by its intended storage accesses at any point in time. Only the supervisory access key allows simultaneous access capability to more than one key, and without performing specific PSW access key management.

But other protection techniques require the execution of specially programmed instructions in their critical paths which decrease their performance, such as the use of program call/return instructions, in order to use virtual addressing protection techniques that involve the performance overhead of address-space switching (which is not required by key protection).

For example, a software subsystem may be put into one address space and its applications in different address spaces to provide virtual address space separation. Then, a significant loss of performance results in having to switch address spaces when moving between the subsystem to the application, and such address space switching overhead is avoided by this invention while obtaining all the needed protection benefits, by assigning a different storage key to the application program than to the subsystem data, but allowing access by the subsystem to the application program's data without access key management.

SUMMARY OF THE INVENTION

This invention adds a third unidirectional access level to the storage key protection method presently found in systems using the IBM S/390 architecture, which has a two level protection structure, comprised of a supervisory level (key 0) and a non-supervisory level (keys 1-15). The program routines operating in the supervisory level can access non-supervisory level storage blocks, but program routines operating in the non-supervisory level cannot access the supervisory level storage blocks.

The invention maintains the two unidirectional access protection levels of the prior S/390 key protection method while splitting a third unidirectional access protection level from the second level for use as a publicly accessible level. The invention maintains the performance advantage of key protection for all three levels in not increasing the program code requirements to permit short instruction path length and not requiring any address space switching. The third level of storage key control is herein called the public storage key (PSK) level. These three levels provide three classes of protection keys, which are: a supervisory class, an intermediate class, and a public class. All classes are allocated specific values out of a coded set of protection keys. For example when a four-bit code is used, providing 16 keys, the keys in all classes are allocated from these 16 codes. The assignment of particular code values to the respective classes is initially arbitrary, but once assigned, the assigned codes must be consistently used. Each of the three classes may have one or more protection keys. The supervisory class (the highest class) is presumed to have a single protection key, which may be key 0. The PSK class (the lowest class) may have one or plural keys. If plural PSK values are assigned, an access using one of the PSKs can only access blocks having the same PSK value, and it cannot access blocks having any other PSK value. Those of the 16 codes not assigned to the supervisory and PSK classes are available for use by the intermediate class. An intermediate class access key may access not only the storage blocks assigned to it but also the storage blocks assigned to any PSK.

Accordingly, it is a primary object of this invention to provide a storage protection system that supports a public key class that can operate with the conventional supervisory key and a unique intermediate class of protect keys.

It is another object of this invention to protect all blocks of storage not assigned a public storage key from wild stores caused by instructions executing under the access authority of a public storage key, whether the instructions are executing in the same address space or in a different address space.

It is another object of this invention to protect the storage blocks of any single PSK value from access by instructions running under any different PSK value, while at the same time, they may be freely accessed without key management program steps by instructions executing with access authority of any value of in the supervisory key class or in intermediate key class, either in the same address space or in a different address space.

The first (supervisory) class may be chosen, for example, as key 0 to maintain compatibility with prior programs that have used key 0 as the supervisory key. Then the third (public) class may be arbitrarily chosen as one or more of the remaining keys (1-15); for example, key 9 may be chosen as the PSK. This leaves the keys 1-8 and 10-15 to comprise the second (intermediate) class.

The conventional storage protect key has a fetch protect bit (FP) field and an ACC field, which are used with the new arrangement of keys provided by this invention, but with some modification in operation. Hereafter, an equal condition (or unequal condition) refers to equality (or inequality) between the ACC field content in the addressed storage protect key and an access key field (usually the key field obtained from the PSW).

The operating rules for the new third (public) class are that a public access key can only store into a block if an equal condition is found with the block's public storage key, regardless of the setting of the FP bit in the storage key. But fetching by a public access key is controlled by the FP bit setting: If FP is 1 in the storage key, fetching is only permitted if equality exists between the public access key and the public storage key. But if FP is 0 in the storage key, fetching is permitted without equality between the public access key and the public storage key.

The rules for the second (intermediate) class keys (1-8 and 10-15) are changed by this invention to accommodate the new PSK class. Previously, equality was always required for a program using a non-supervisory access key to store into any block having a non-supervisory key. This is changed by this invention which allows any intermediate class key (as well as the supervisory class key) to store or fetch into any PSK block without equality, regardless of the state of the FP bit.

As a consequence, the capability of the intermediate key is extended to access blocks having different storage keys without using special key management programming, which previously only the supervisory key could do. Thus with this invention, a program using an intermediate key can access not only storage blocks assigned the intermediate key but also storage blocks assigned any public key. This invention therefore avoids the previous requirement of having to use additional programmed instructions to change a non-supervisory key (e.g. in the PSW) before any non-supervisory key could access a block with a different key. For example, a program running with an intermediate access key can execute a load instruction from a word in a fetch-protected block with a storage key equal to the same intermediate key, and in the very next instruction use a Store instruction to a block of storage with a public storage class key.

But equality remains a requirement for an intermediate class key to store into a block using an intermediate class key, regardless of the FP setting. And fetching is controlled by the FP setting: If FP is 1 in the storage key, fetching is only permitted if equality exists between the intermediate access key and another intermediate storage key. But if FP is 0 in the storage key, fetching is permitted without equality between the intermediate access key and the intermediate storage key.

The rules for the supervisory class key (0) are not changed by this invention, but are extended to the PSK blocks—no key equality is required for accessing any storage block (including a PSK block) by a program using access key 0 except with blocks assigned storage key 0.

Thus, any intermediate key (0-8 and 10-15) user can access any public key (9) storage block. But no public key (9) user can store (or fetch if fetch protection is on) into any storage block protected by a supervisory key (key 0) or by an intermediate storage key (keys 0-8 and 10-15).

DETAILED DESCRIPTION OF AN EXAMPLE OF THE INVENTION

Figure 1:
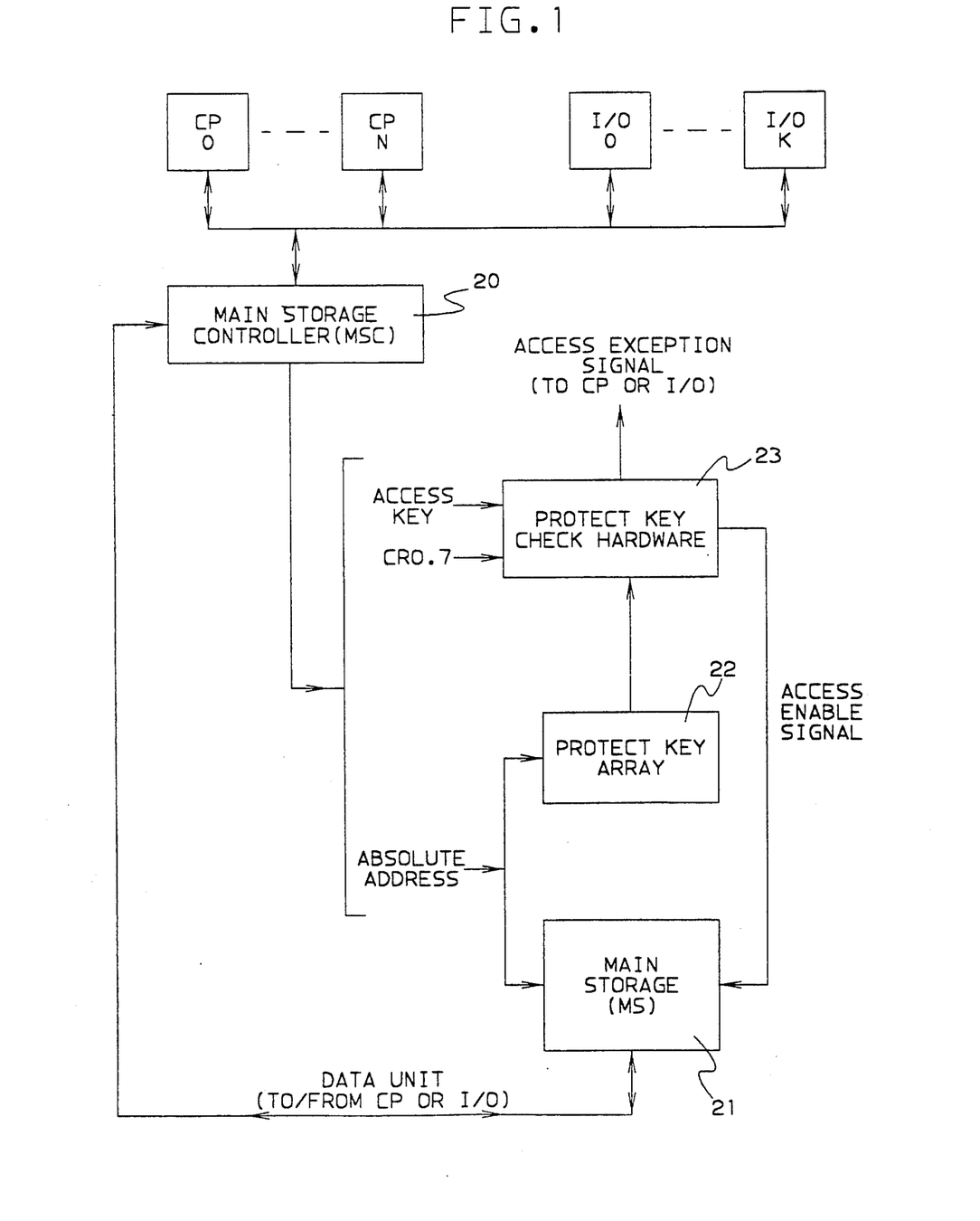
FIG. 1 represents hardware containing an embodiment of the invention.

FIG. 1 is inclusive of hardware containing a preferred embodiment of the invention. It has a plurality of central processing units, CP-0 through CP-N, and a plurality of I/O devices, I/O-0 through I/O-K, with their subchannels, control units and channels. The CPs and I/Os are making memory access requests to a main storage controller 20 which controls the fetching and storing of data units in a main storage (MS) 21. MS 21 is comprised of a plurality of DRAM arrays for containing the MS data units. Each MS access request includes an absolute address of the data unit being fetched or stored in MS. The CPs generate logical addresses, which usually are virtual addresses, but may be real addresses, in accordance with the S/390 architecture. Each virtual address generated by any CP is translated in the CP to an absolute address which is sent with the access request to MS, along with the access key of the requestor.

Each requested absolute address has a high-order part that represents the address of the 4 kilo-byte (KB) block (herein called a "page") in MS containing the requested data unit.

A protect key array 22 is comprised of one or more DRAMs that contain storage protect keys of the type defined in the S/390 architecture.

The keys in array 22 are associated with the respective page units of data storage in MS 21 on a one for one basis. When MS 21 is sent the address of a data unit, key array 22 is simultaneously sent the address of the page of the data unit to locate the storage protect key in array 22 that is associated with the data unit being accessed in MS 21. This manner of addressing MS and the key array is well known in the prior art.

Figure 2:
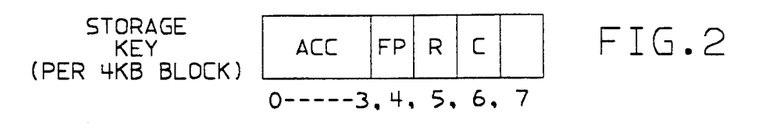
FIG. 2 represents a conventional storage protect key.

FIG. 2 shows the form of each storage protect key in array 23 (which is defined by the S/390 architecture). Each storage protect key occupies a byte of storage in the key array, and it has a number of fields including a four-bit ACC field which is often referred to as the "storage protect key" when more precisely the entire byte is the storage protect key. Other fields in the storage protect key are the single bit fields: FP (fetch protect), R (reference) and C (change). The content of the ACC "key" field in the storage protect key is matched with a four-bit "access key" provided by the program requesting the MS access. The invention controls how the matching operates, and it may be affected by setting of the FP bit field.

Protect key check hardware 23 receives each storage protect key fetched in key array 22. Check hardware 23 checks the fetched "storage protect key" against an "access key" being provided with the current request being made by a CP or I/O.

Figure 3:
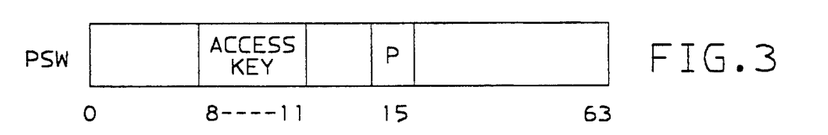
FIG. 3 represents an access key and a P bit in a program status word (PSW).
Figure 4:
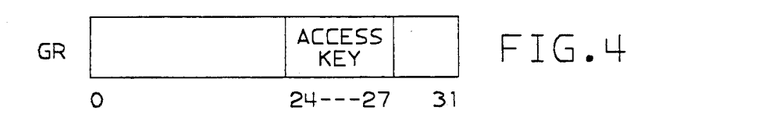
FIG. 4 represents an access key in a general purpose register (GR) used by a few different types of instructions.
Figure 5:
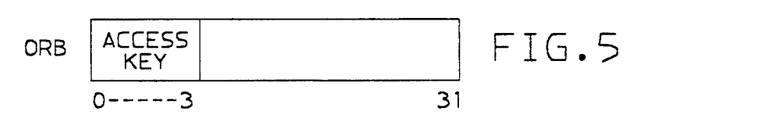
FIG. 5 represents an access key in an operation request block (ORB) used for an input/output operation.

The "access key" is obtained from a control element that is defined by the prior art S/390 architecture. The access key is provided by the respective CP or I/O execution requesting the MS accessing operation. FIGS. 3, 4 and 5 show different sources for the access key. The particular source is selected by the CP or I/O entity making the MS request.

FIG. 3 shows the PSW (program status word) source of the access key in each of CPs 0-N. The PSW in a respective CP is the source of the access key for most instructions executed by the CP that request an MS access. A few CP instructions do not use the PSW as the only source of an access key, in which case an access key source is a general purpose register (GR), in which the access key is found in bit positions 24–27, which is shown in FIG. 4. These few instructions are defined in the S/390 architecture as: move to primary, move to secondary, move with key, move with destination key, and move with source key.

Figure 6:
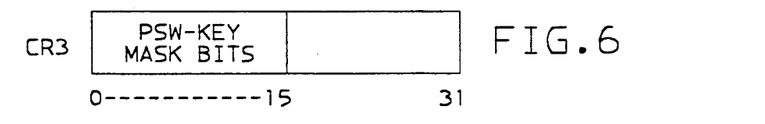
FIG. 6 represents a PSW key mask bit field in control register (CR) 3.

In FIG. 3, a P field in PSW bit position 15 controls whether the respective CP is operating in problem or supervisory state. If in problem state (PSW bit 15 is one), the PSW key mask in CR3 (see FIG. 6) is used to determine if the requestor is authorized to use the access key specified in the GR. If in the supervisory state, the key specified in the GR is used without regard to the PKM.

FIG. 5 shows the ORB (operation request block) used by most I/O access requests (from any I/O device I/O-0 to I/O-K) as its source of the access key for the I/O requested MS access. An ORB is a control block in MS which is obtained by a start subchannel instruction, which starts any I/O device in the S/390 architecture. Bit positions 0-3 in the ORB contain the access key.

Figure 7:
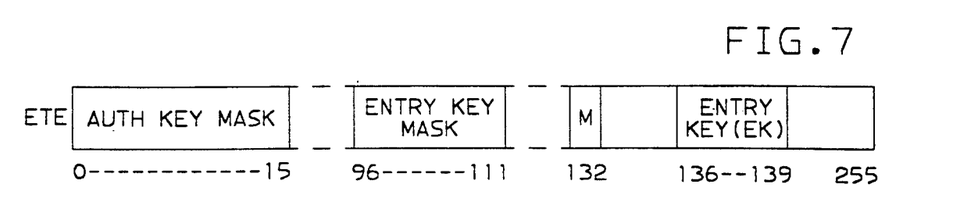
FIG. 7 represents an entry key and key mask fields used in address space control.

The stacking program call (PC) instruction in the S/390 architecture uses an access key derived from an ETE (entry-table entry), in which the access key is called EK (entry key) shown in FIG. 7. The use of the EK access key operates with a PSW-key mask field in CR (control register) 3 shown in FIG. 6. The effective mask may be a modification of the PSW-key mask field in CR (control register) 3, as modified by an authority key mask field and an entry key mask field under the control of a M field in the ETE shown in FIG. 7, as defined in the S/390 architecture.

Figure 8:
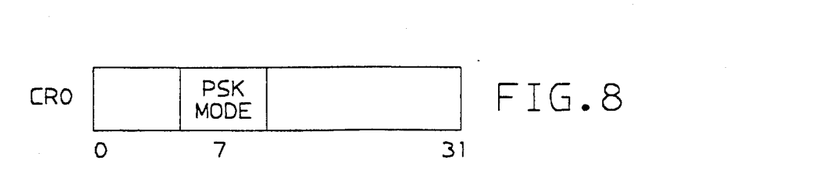
FIG. 8 represents a (PSK) public storage key mode control field used by the preferred embodiment of the invention.

The operation of the invention embodiment is controlled by the setting of a PSK (public storage key) mode field shown in FIG. 8 in CR 0 bit position 7 (referred to as CR 0.7). The operation of the invention is invoked if bit CR 0.7 is set to 1, and conventional key operation is obtained when CR 0.7 is set to 0.

Figure 9:
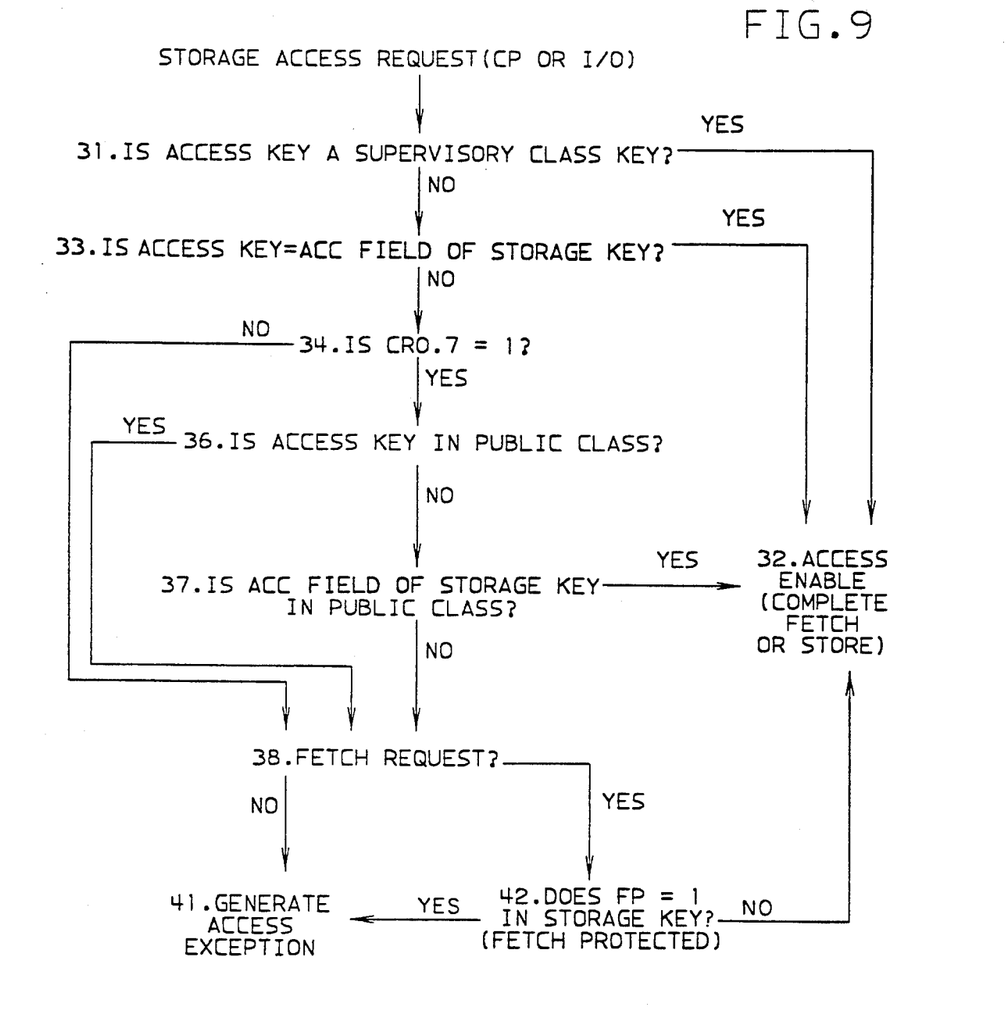
FIG. 9 is a flow diagram of the preferred embodiment of the invention.

FIG. 9 represents the process of the preferred embodiment of the invention, which is executed for each storage access request from any CP or I/O in the system when CR 0.7 is set to its 1 state to enable PSK operation.

In FIG. 9, step 31 is entered upon a storage access request receiving priority for execution by the main storage controller in FIG. 1 in the conventional manner.

If step 31 finds the provided access key is the supervisory key (key 0), then the yes path is taken to step 32 to complete the access and in FIG. 1 the "access enable" signal is provided to MS 21 by the protect key check hardware 23 to enable MS to complete the requested fetch or store access in MS. If step 31 finds the access key is not in the supervisory class, the not path is taken to step 33.

Step 33 tests the access key to find if it is equal to the ACC field in the storage protect key (see FIG. 2). If yes, the path to step 32 is taken to complete the fetch or store. But if the access key is not equal to the storage key, the no path is taken to step 34 which tests the state of mode bit CR 0.7 to determine if it is in PSK or conventional mode. If CR 0.7 is in 0 state, the PSK mode is not currently in force and the no exit is taken to step 38. Then the request is tested by step 38 to determine if it is a fetch request or not. A no fetch finding by step 38 indicates the access request is for a store. If it is found to be a store access, its completion is not allowed since a store request is allowed only if the access key was found by step 33 as equal to the storage key, causing the yes path to be taken from step 33 to step 32. But the no exit was taken from step 33 indicating inequality between the access key and the storage key, prohibiting completion of the store request. Then, step 38 takes its no path to step 41 if no fetch request is found by step 38, and step 41 generates an access exception to indicate no completion will be done for this store request. Accordingly, the access enable line in FIG. 1 is not activated, which prevents the store access from occurring in MS.

But if CR 0.7 is found to be in its 1 state by step 34, the PSK mode exists and the yes path is taken to step 36, which determines if the access key is in the public class by testing for its equality to any one of the code values defined as members of the public class. The yes path is taken to step 38 if the access key is found equal to any key in the public class. (For example, the value 9 or 15 might be selected as a single key in the public class, or a multiple key public class might have keys 9, 10 and 15.)

However, if the access key is not equal to any key in the public class, the no path is taken from step 36 to step 37. Step 37 determines if the current access key is a public access key by testing if it is equal to any key in the public class. If the access key is a public access key, the yes path is taken from step 37 to step 32 to complete the fetch or store access in MS. But if step 37 finds the access key is not a public key, step 38 is entered to determine if the current request is a fetch or no fetch (which is a store), because the FP bit state is used to possibly allow access only if it is a fetch request.

As previously explained, the no path from step 38 to step 41 is taken if it is found to be a store request (because a store is not allowed when prior step 33 has found the access key unequal to the storage key). However, the yes path from step 38 to step 42 is taken if it is found to be a fetch request. Step 42 tests the state of the FP field in the currently addressed storage protect key to determine if fetch protection is set on (FP=1), in which case fetching is prohibited and the yes path is taken to step 41 which generates an access exception that indicates a prohibited action is being taken in which case an interruption is taken and the execution is suppressed for the current instruction. If step 42 finds fetch protection is set off (FP=0), the fetch is allowed and the no path is taken to step 32.

Figure 10:
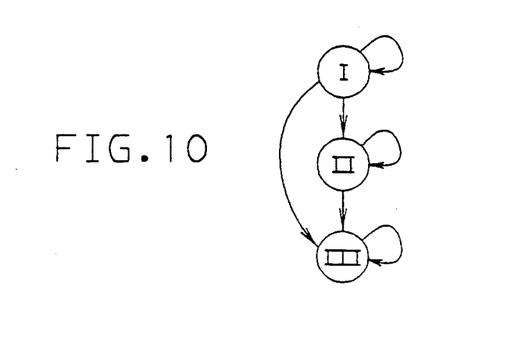
FIG. 10 is a state diagram representing the operation of the invention.

In the state diagram in FIG. 10, a hierarchy of three key classes, Class I, II and III is shown in which I is the highest and III is the lowest, with access control being successively more restricted in the order of Class I to II to III. Class I is the supervisory class, Class II is the intermediate class, and Class III is the public class. Each class contains one or more protect keys. For example, in a system specifying its protect keys in a four-bit protect key field (wherein the protect keys are specified as keys 0-15), the supervisory Class I may arbitrarily be represented by key 0. The public Class III may be arbitrarily represented by key 9. Then the intermediate Class II is represented by the remaining keys 1-8, 10-15.

In the diagram of FIG. 10, each class can access itself, as is indicated by the circular arrow that leaves each class circle and returns to the same circle; this represents the compare-equal case in an access key to storage key comparison. Class I can access any other class, intermediate Class II or public Class III. The only other class that intermediate Class II can access is public Class III. And use of a public key in Class III cannot access any other class, and public keys are subject to the compare equal test of access key to storage key before one public class key is allowed to enter a storage block assigned another public class storage key.

The following chart represents the fetch and store operations resulting from the use of any storage key and any access key when using the three states represented in FIG. 10 as controlled by the method in FIG. 9. The setting of the fetch protect (FP) bit in the storage key controls the fetching operation where F is shown with an asterisk (*), i.e. F*, in the following chart:

| THREE CLASS ACCESS CONTROL CHART | | | | |
|---|---|---|---|---|
| | | STORAGE KEY | | |
| | | CLASS I | CLASS II | CLASS III |
| ACCESS | CLASS I | F/S | F/S | F/S |
| KEY | CLASS II | F* | F*/S* | F/S |
| | CLASS III | F* | F* | F*/S* |

LEGEND:
F/S = Fetch or Store Access Allowed. (FP setting has no effect)
F* = Fetch Access Allowed Only If: a) FP = 0, or b) Access Key = Storage Key if FP = 1.
S* = Store Access Allowed Only IF: access key = storage key (FP setting has no effect).

Figure 11:
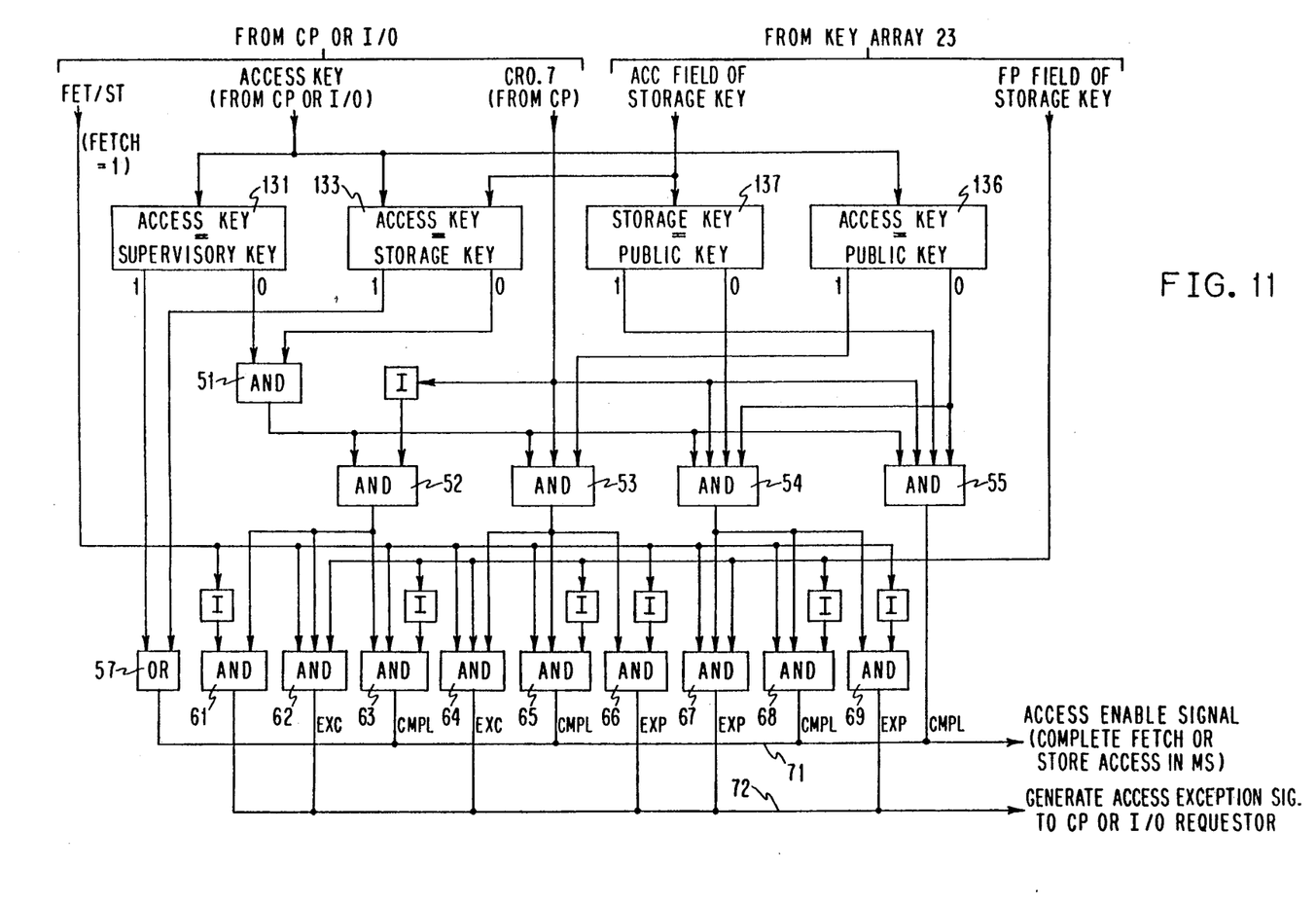
FIG. 11 is a hardware representation of the preferred embodiment of the invention.

FIG. 11 illustrates key check hardware which preferably is operated to overlap the key check operation with the MS accessing operation. That is, this key protect check hardware can be operating simultaneously with a DRAM accessing operation in MS, and this check hardware can generate its output, either an "access enable" signal or an "access exception" signal, before the memory can complete a fetch or store operation for a requested data unit.

The four compare circuits 131, 133, 137 and 136 perform the compare operations respectively represented in FIG. 9 by steps 31, 33, 37 and 36, which simultaneously (in parallel) do their comparisons in FIG. 11. The output line 71 provides the "access enable" signal shown in FIG. 1. The output line 72 provides the "access exception" signal shown in FIG. 1. These are the same functions represented in FIG. 9 steps 32 and 41, respectively.

Positive logic circuits are shown in FIG. 11, and it is apparent to those skilled in the computer circuits arts that any of a number of AND, OR, INVERT circuit types may be used to implement the circuits shown therein. Each of the compare circuits 131, 133, 137 and 136 perform the compare operations respectively represented in FIG. 9 and is shown in FIG. 11 with complementary 1 and 0 outputs. The 1 output is active when a yes condition is required from the circuit to meet the conditions in FIG. 9, and the 0 output is active when a no condition is required from the circuit to meet the conditions in FIG. 9.

The correspondence between the operations in FIGS. 9 and 11 is as follows: A signal from OR circuit 57 represents the yes path from either step 31 or 33 in FIG. 11. AND gate 55 represents the no path from step 37. A signal from any of AND gates 61, 64 and 67 represent the no path form step 38. A signal from any of AND gates 62, 64 and 67 represent the yes path from step 42. And, a signal from any of AND gates 63, 65 and 68 represent, respectively, the no path from step 42.

The hardware representation in FIG. 11 is one way to accomplish the process in FIG. 9. Boolean mathematical manipulation can be applied to the circuit representations in FIG. 11 to provide many other circuit representations that accomplish the same operations. For example, the plural AND gates and their inputs can be combined into one AND gate per path sequence in FIG. 9, in which AND gates 51, 52, 53 and 54 can be combined into AND gates 61–69 to reduce the AND gate operations to a single level of AND gates.

In FIG. 11, line 71 dot-ORs a plurality of signals from OR circuit 57 and AND gates 63, 65, 68 and 55 (of which only one circuit/gate provides a signal at any one time on line 71) to generate and output the "access complete" signal. Line 72 dot-ORs a plurality of signals from AND gates 61, 62, 64, 66 and 69 (of which only one of these gates provides a signal at any one time on line 72) to generate and output the "access exception" signal.

While the invention has been described with respect to preferred embodiments thereof, it will be understood by those skilled in the art that various changes in detail may be made therein without departing from the spirit, scope and teaching of the invention.

Having thus described our invention, what we claim as new and desire to secure by Letters Patent is:

1. Means for protecting against unauthorized accesses by program requests for accessing data units in blocks in a storage of a computer system, comprising:
   processor means for providing an address of a data unit to be accessed in a block in storage and providing an access key associated with a program requesting the access in the block and providing a fetch/store signal identifying the manner of access;
   means for fetching a storage key associated with an addressed block in storage;
   means for testing if an access key equals a supervisory key for providing a supervisory key signal;
   means for comparing an access key with the storage key to provide an equal key signal;
   means for determining if the storage key equals a public key value to provide a public storage key signal;
   means for finding if an access key equals the public key value to provide a public access key signal; and
   circuit means for enabling the addressed data unit to be accessed and sent to the requesting processor means if (1) the supervisory key signal is provided, or (2) if the equal signal is provided, or (3) if the public storage key signal and no public access key signal and no equal signal and no supervisory key signal are provided, or (4) if the fetch request signal and the public access key signal and no equal signal and no supervisory key signal are provided whenever the use of the public key value is enabled, or (5) if the fetch request signal and the public access key signal and no equal signal or no supervisory key signal are provided whenever use of the public key value is disabled.

2. Means for protecting against unauthorized accesses by program requests as defined in claim 1, further comprising:
   circuit means for generating an exception signal for the processor and preventing the addressed data unit from being sent to the requesting processor means (1) if the store request signal and no public storage key signal and no public access key signal and no equal signal and no supervisory key signal are provided whenever use of the public key value is enabled, (2) if the store request signal and the public access key signal and no equal signal and no supervisory key signal are provided whenever use of the public key is enabled, or (3) if the store request signal and the public access key signal and no equal signal are provided whenever use of the public key is disabled.

3. Means for protecting against unauthorized accesses by program requests as defined in claim 2, further comprising:

the circuit means being a combination of AND, OR circuits with signal inversion means being provided for no-state conditions in circuits.

4. Means for protecting against unauthorized accesses by program requests as defined in claim 3, further comprising:

means for indicating the state of a public key mode field in a control register in the processor means for indicating when the use of the public key value is enabled or disabled.

5. Means for protecting against unauthorized accesses by program requests as defined in claim 3, further comprising:

the processor means being any of plural processors in the computer system, including any central processor or any input/output (I/O) processor.

6. A method of providing access protection for data blocks in a storage of a data processing system, in which different programs may access the blocks, comprising the steps of:

electronically-detecting one or more key values as public storage and access keys available in a computer system of which the remaining key values are detected electronically as non-public storage and access keys;

electronically-assigning a public access key value to electronically constrain accesses by a particular program to the storage; and electronically-assigning a public storage key value to each block to be electronically stored-in primarily by programs executing with a public access key and also being storable by programs executing with a non-public access key, and any block assigned a non-public storage key not being storable by programs assigned a public access key.

7. A method of providing access protection between storage blocks as defined in claim 6, further comprising the steps of:

electronically-allowing storing by the particular programing each block assigned a public storage key when equality is obtained between the program's access key and the public storage key, and electronically-allowing storing in the block assigned the public storage key by the other programs having non-public access keys not equal to a public storage key.

8. A method of providing access protection between storage blocks as defined in claim 6, further comprising:

electronically-enabling the use of the public access and storage keys by setting a state in the computer to a public storage key mode.

9. A method of providing access protection between storage blocks as defined in claim 6, further comprising:

electronically-detecting a fetch protect field in association with the public storage key assigned to any block; and electronically-enabling a program assigned a public access key to allow fetching (but not storing) in a block assigned a non-public storage key if the fetch protect field if set off, but not allowing fetching in the block if the fetch protect field is set on, and to always prevent storing by the program using the public access key in any block assigned a non-public storage key.

10. A method of providing access protection for data blocks in a computer storage of a data processing system, in which different processes may access the block, comprising the steps of:

electronically-signaling an assignment of a public access key to a particular program selected from one or more keys as public access key(s) from a range of key values 0–15 usable in the system, and electronically-signaling an assignment of the value of the public access key as a public storage key to each block in storage to be accessed by the particular program and by each program in the system assigned a non-public access key from the remaining key values in the range; and electronically-allowing the particular program to store in blocks assigned the public storage key only when that key is equal to the public access key of the particular program, but allowing storing in the block by each program using a non-public access key without having equality between the non-public access key of the program and the public storage key of the block.

11. A method of providing access protection between storage blocks as defined in claim 7, further comprising:

electronically-selecting key value 0 in the range 0–15 as a supervisory key, and not allowing any program using any access key value in the range 1–15 to store in any block in storage assigned storage key 0.

12. A method of providing access protection between storage blocks as defined in claim 11, further comprising:

electronically-selecting key 9 as a public storage key from the range 0–15, and electronically-representing assignments of keys 1–8 and 10–15 as non-public non-supervisory intermediate keys which can be used to access any block assigned public storage key 9.

13. A electronic method of providing unidirectional isolation among blocks in a storage in a computer system using protect keys for protecting blocks from being stored into by programs not having a required storing authority, comprising:

electronically-signaling an assignment of at least one of the protect keys as a supervisory key in a supervisory key class (1st class) for use by supervisory programs, assigning at least one other of the protect keys as a public storage and access key in a public key class (3rd class) for use by programs restricted to storing in blocks assigned a storage protect key equal to the public storage key, and assigning one or more of the protect keys to an intermediate key class (2nd class); and electronically-allowing programs assigned an access key equal to any key in the supervisory key class or equal to any key in the intermediate key class to have store and fetch access to blocks assigned the public storage key, but not allowing any program using the public access key to store into any block not assigned the value of the public access key as a storage key.

14. A method of providing access protection between storage blocks as defined in claim 13, further comprising:

electronically-setting a public storage key mode field in a control register to specify either a public key state or a no public key state, the public key state enabling the use of the public access key for any program and the public storage key for any block, the no public key state disabling use of the public access and storage keys and controlling the same key value to be used as non-public storage and access keys.

15. A method of providing access protection to blocks of storage in a system having concurrent execution of multiple programs, comprising:

electronically-representing a set of keys for preventing store and fetch accesses by unauthorized programs to assigned blocks in storage;

electronically-selecting a plurality of key values in the set as public access and storage keys (3rd class), selecting another key value in the set as a supervisory key (1st class), and selecting the remaining key values in the set as intermediate keys, the supervisory and intermediate keys being non-public keys; and electronically-allowing any program assigned an access key value equal to any non-public storage key value in the set to have read and write access to any block assigned a storage key equal to any public storage key, but electronically-allowing a program assigned an access key value equal to any public access key to have read and write access to a block assigned a public storage key equal to the value of the public access key, and not electronically-allowing the latter program to have write access to any block having a storage key equal to a non-public storage key or a storage key equal to a public storage key different from the public access key.

16. A method of providing access protection for storage blocks as defined in claim 15, further comprising:

electronically-allowing any program assigned a non-public access key to access any storage block assigned a public storage key without equality and not electronically-requiring any program instructions to change the non-public access key for allowing the program to access storage blocks assigned the non-public key value and storage blocks assigned any public storage key value to enable any non-public access key to access storage blocks using different storage keys.

17. A method of providing access protection between storage blocks as defined in claim 15, further comprising:

electronically-representing a fetch protect mode having on and off states for an associated storage key to allow fetching in an associated block when the off state exists and not to allow fetching in the associated block when the on state exists; and electronically-allowing any program with a public access key to have fetch access (but not store access) in any block having any non-public key value as its storage key when its fetch protect mode is in an off state, but not electronically-allowing fetch access or store access in the block having the non-public key value when its storage key has its fetch protect mode in an on state.

* * * * *